United States Patent [19]

Hammerstrom et al.

[11] Patent Number: 4,796,199
[45] Date of Patent: Jan. 3, 1989

[54] NEURAL-MODEL, INFORMATION-HANDLING ARCHITECTURE AND METHOD

[75] Inventors: Daniel W. Hammerstrom, Aloha; James L. Bailey, Hillsboro, both of Oreg.

[73] Assignee: Oregon Graduate Center, Beaverton, Oreg.

[21] Appl. No.: 17,788

[22] Filed: Feb. 24, 1987

[51] Int. Cl.4 .......................................... G06F 15/18
[52] U.S. Cl. ................................................. 364/513
[58] Field of Search .............. 364/513, 300; 382/14, 382/15, 36, 37, 38

[56] References Cited

U.S. PATENT DOCUMENTS

| | | | |
|---|---|---|---|
| 4,591,983 | 5/1986 | Bennett et al. | 364/478 X |
| 4,622,632 | 11/1986 | Tanimoto et al. | 364/200 |
| 4,644,496 | 2/1987 | Andrews | 364/900 |
| 4,648,044 | 3/1987 | Hardy et al. | 364/300 X |
| 4,658,370 | 4/1987 | Erman et al. | 364/513 |
| 4,670,848 | 6/1987 | Schramm | 364/513 |

OTHER PUBLICATIONS

A microprocessor-based Hypercube Supercomputer; Hayes et al; IEEE Micro; Oct. 1986; pp. 6-17.

Primary Examiner—Allen MacDonald
Attorney, Agent, or Firm—Kolisch, Hartwell & Dickinson

[57] ABSTRACT

A neural-model computational method and architecture structure based on connectionism featuring broadcast-hierarchical, locality-of-communication-dominant operation. According to the hierarchical nature of the invention, the system thereof is organized into plural communication levels, wherein what might be thought of as a lower level handles all communications that take place solely on that level, and what might be thought of as a higher level handles "long-distance" communications interlevel. Communication takes place in what is referred to herein as a braodcast manner in the sense that a communicating source broadcasts its communication simultaneously to the entirety of that part of the system wherein expected recipients are located. The locality-of-communication-dominance feature groups and organizes the various communication sources generally in accordance with their respective frequencies of communication, assigning addresses, respectively, whose lengths generally relate in an inverse proportion to these frequencies.

12 Claims, 5 Drawing Sheets

| BUS 1 | | BUS 2 | | BUS 3 | |
|---|---|---|---|---|---|
| 00 | A | 01 | A | 11 | A |
| 00 | A | 10 | A | 11 | A |
| 00 | A | 10 | A | 10 | A |
| 01 | A | 10 | A | 01 | A |
| 01 | A | 10 | A | | |

NEURAL-MODEL, INFORMATION-HANDLING ARCHITECTURE AND METHOD

BACKGROUND AND SUMMARY OF THE INVENTION

This invention pertains to a computational method and architecture structure, and more particularly, to such a method and structure which are based on neural-model connectionism.

Recently, the use of the so-called "connectionist" model has gained popularity as an alternative computational paradigm for artificial intelligence systems that display cognitive behavior. Connectionist models are based on the structure of the brain's neural networks, and because of this, are capable of exhibiting computational behavior which is similar to that of the brain. The most important part of such behavior is the ability to process an input and to reach a conclusion in a few steps, instead of the usual thousands of steps which take place in a typical, sequential computer program.

Connectionist models consist of many simple processors that modify the strengths of their interconnections in order to store data. These processing elements in a connectionist network do not solve a given problem individually. Instead, they compute by being connected appropriately to large numbers of similar units. More specifically, they function by generating, in parallel, multiple competing hypotheses, and by then relaxing to a single, best-match interpretation.

In the structure, and according to the method, which are disclosed herein, two types of processors are involved. One of these is referred to as a connection node which, as will be explained, is not a physical element, but rather takes the form of a simple computing "center". The particular function that is computed by a connection node is dependent on the particular connectionist model that has been selected. Implementation of the present invention is in no way dependent upon this selected function, and accordingly, no function discussion is included in the text which follows.

The other kind of processor is referred to as a physical node, which is a physical element that takes the form of an independent processor which is capable of performing standard arithmetic and logical computations. Directly associated with each physical node are plural connection nodes. Stated more precisely, each physical node "creates" (i.e., virtualizes) its associated connection nodes (virtual nodes) through using data stored within the memory structure which also forms part of the physical node.

A principal object of the present invention is to provide a unique architecture structure, and a computational method, which organize and employ physical nodes and connection nodes in a manner that tends to maximize the capabilities and advantages of a neural-model, connectionist, computational network.

More particularly, an object of the invention is to provide such a method and structure that tend to maximize the number of node connections which can exist for communication within the minimum possible space.

Still a further object of the invention is to provide an architecture structure and a method of the types just generally outlined which exhibit a high degree of tolerance to physical flaws or faults in the structure.

According to a preferred embodiment of the invention, what is proposed is referred to herein as a broadcast-hierarchical organization of physical and connection nodes, whereby connection nodes communicate with one another on plural hierarchical, communication (bus) levels. Connection nodes "speak" to one another on the appropriate levels by communicating, inter alia, their local addresses and their "states".

The proposed architecture structure is organized in such a fashion that those connection nodes which communicate with one another most frequently are arranged in closely knit communities, and are connected to "talk" to one another via the lowest-level communication bus, in order to maximize the efficiency of communication. Such localization also minimizes the required memory structure for such nodes by virtue of minimizing the lengths of the addresses which are communicated for identification purposes. The locality of communication in the interconnection architecture proposed herein takes advantage of, and can be tailored to, the natural locality that is a characteristic of connectionist/biological neural network models. Put another way, this organizational concept, which promotes what is referred to herein as locality of communication, essentially assigns the shortest addresses, and therefore the smallest amount of data required to transmit the same, to those connection nodes which experience the greatest frequencies of communication. Nodes with lesser frequencies of communication, which nodes typically communicate on one of the higher communication levels, are assigned longer addresses (a necessary fact which will become apparent), and thus require more data and hence more memory space successfully to communicate these addresses.

A neural, connectionist network of the type generally referred to above will, fundamentally and necessarily, feature extremely large fan-in (inputs) and fan-out (outputs) characteristics vis-a-vis its connection nodes. The broadcast-hierarchical architecture proposed by the present invention is especially suited for accommodating such an environment.

According to a preferred manner of practising the invention, in a broadcast-hierarchical setting including at least two levels of communication, the same includes the steps of establishing a first information-handling level including plural neighborhoods of connection nodes, creating a communication discourse between selected nodes (communication units) on this first level alone whereby a node in a given neighborhood is able to communicate only with a neighboring node, establishing at least a second, higher-level communication level which is effective operatively to link each neighborhood with at least one other neighborhood, and enabling on such second level of communication a communication discourse between a node in a given neighborhood with at least one node in a linked neighborhood.

According to the structure and method outlined above, the various physical nodes and their associated connection nodes operate asynchronously vis-a-vis one another, with communication from a given connection node at a given time broadcast simultaneously to each and every other connection node with which it is expected to communicate. By using the locality of communication concept, which groups and organizes interconnecting connection nodes generally in accordance with their respective frequencies of communications, and by assigning address lengths which generally relate to these frequencies in an inverse proportion, memory space is saved, communication is speeded, and competition for communication bus access is minimized.

Various other features and advantages which are offered by the novel method and apparatus proposed by the present invention will become more fully apparent as the description which now follows is read in conjunction with the drawings.

DETAILED DESCRIPTION OF THE INVENTION

Figure 1:
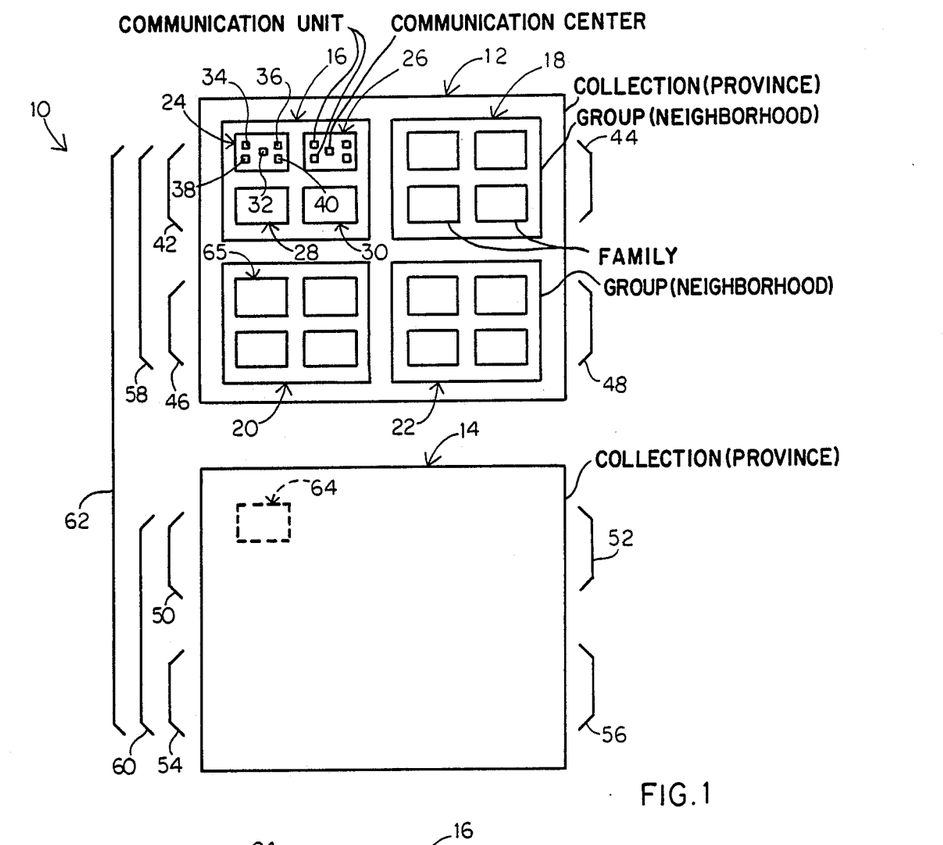
FIG. 1 is a schematic illustration of an information-handling architecture structure constructed in accordance with the present invention.

Turning attention now to the drawings, and starting first of all with FIG. 1, indicated generally at 10 is a computation system which is constructed, and which performs, in accordance with the present invention. System 10 is also referred to herein as a neural-model, broadcast-hierarchical, locality-of-communication-dominant, information-handling architecture structure. As will become apparent in the description which follows, system 10, as disclosed herein, is displayed as a relatively simple system in order to facilitate an easy understanding of the architecture and operation of the system. In practice, an actual system will, as will be discussed later, be far more extensive in order to have the capability to offer practical neural-model processing. Despite the simplicity chosen to illustrate system 10, all of the structural and operational principals of the invention are fully disclosed and implemented therein. Those skilled in the art will recognize immediately how these principles can be applied in the making and using of a large system.

Progressing from a bird's-eye to a worm's-eye view of the system architecture, it includes two collections, or provinces, 12, 14, of physical nodes and connection nodes which are organized, within these collections, as will now be described. It should be explained that what are shown as the contents of collection 12 also exist with the same layout and pattern in collection 14, and that a description of the contents of collection 12 fully describes the contents of collection 14.

Within collection 12 there are four subdivisions, also referred to as groups and as neighborhoods, 16, 18, 20, 22, within each of which are four further subdivisions, referred to as families, such as those shown at 24, 26, 28, 30 in group 16. Within each family, such as within family 24, are a physical node, or communication center, such as node 32, and four connection nodes, or communication units, such as those shown at 34, 36, 38, 40. These connection nodes, like the connection nodes referred to early in the introductory portion of this disclosure, are the ones which are associated with (created in memory by) physical node 32. As has been suggested just above vis-a-vis avoiding unnecessary complexity, family 24 is illustrated with only four connection nodes associated with node 32, in order to simplify the disclosure. In practice, node 32 would typically be associated with about one thousand connection nodes.

As can be seen, the physical and connection nodes which appear in FIG. 1 are illustrated only with respect to families 24, 26. It should be understood, of course, that all of the other families present in system 10 have the same internal structures. While such is true for the system now being described, it should be understood further that different physical nodes may be associated with different numbers of connection nodes in a particular system.

In system 10, which is hierarchical, there are three information-handling, or communication, levels. As will become apparent, the number of such levels is dictated by the fact that the physical and connection nodes are organized, themselves, in three different kinds of assemblies—collections, groups and families. A hierarchical system, of course, exists wherever there are two or more communication levels. A three-level system has been chosen here just for illustration purposes.

For each level of communication, there is a specific bus structure which allows communication from a given connection node to be broadcast throughout the relevant portion of that level. Each physical node is connected to all three levels of the bus structures in order both to be aware (for reception/communication purposes) of all incoming communications, and to be prepared to transmit an outgoing communication when required.

Figure 2:
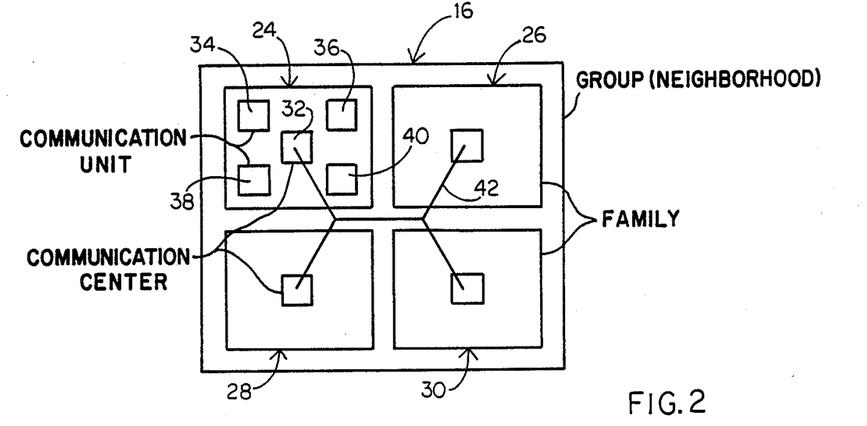
FIG. 2 is an enlarged detail drawn from FIG. 1 to illustrate bus structure which defines the first or lowest level of communication available in the structure of FIG. 1.

At 42, 44, 46, 48 there are shown four brackets which symbolize a first, low-level bus structure (communication level) for each of groups 16, 18, 20, 22, respectively. Thus, all of the physical nodes in group 16 are connected to bus 42, all of the physical nodes in group 18 are connected to bus 44, and so on. This is illustrated in somewhat more detail, and on a larger scale, in FIG. 2 which extracts and isolates group 16 from the rest of system 10.

At 50, 52, 54, 56 in FIG. 1 are shown four brackets which symbolize, for the groups in collection 14, the same first, low-level bus structure which has just been described for the groups in collection 12.

Figure 3:
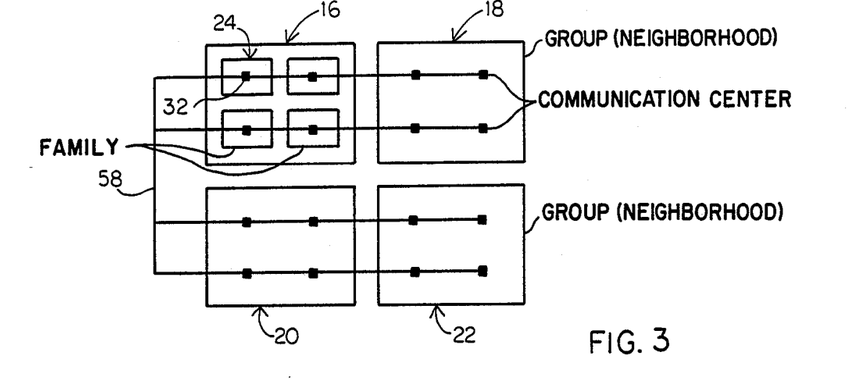
FIG. 3 is an enlarged detail, also extracted from FIG. 1, illustrating bus structure which defines a second, higher level of communication in the structure.

At 58, 60 in FIG. 1 there are shown two brackets which symbolize a second, higher-level bus structure (communication level), with bus 58 being associated with collection 12, and bus 60 being associated with collection 14. FIG. 3 gives a somewhat more detailed picture of bus 58 vis-a-vis collection 12. Here, all sixteen of the physical nodes which exist in collection 12 are shown, and each is seen to be connected to bus 58.

Figures 4, 5:
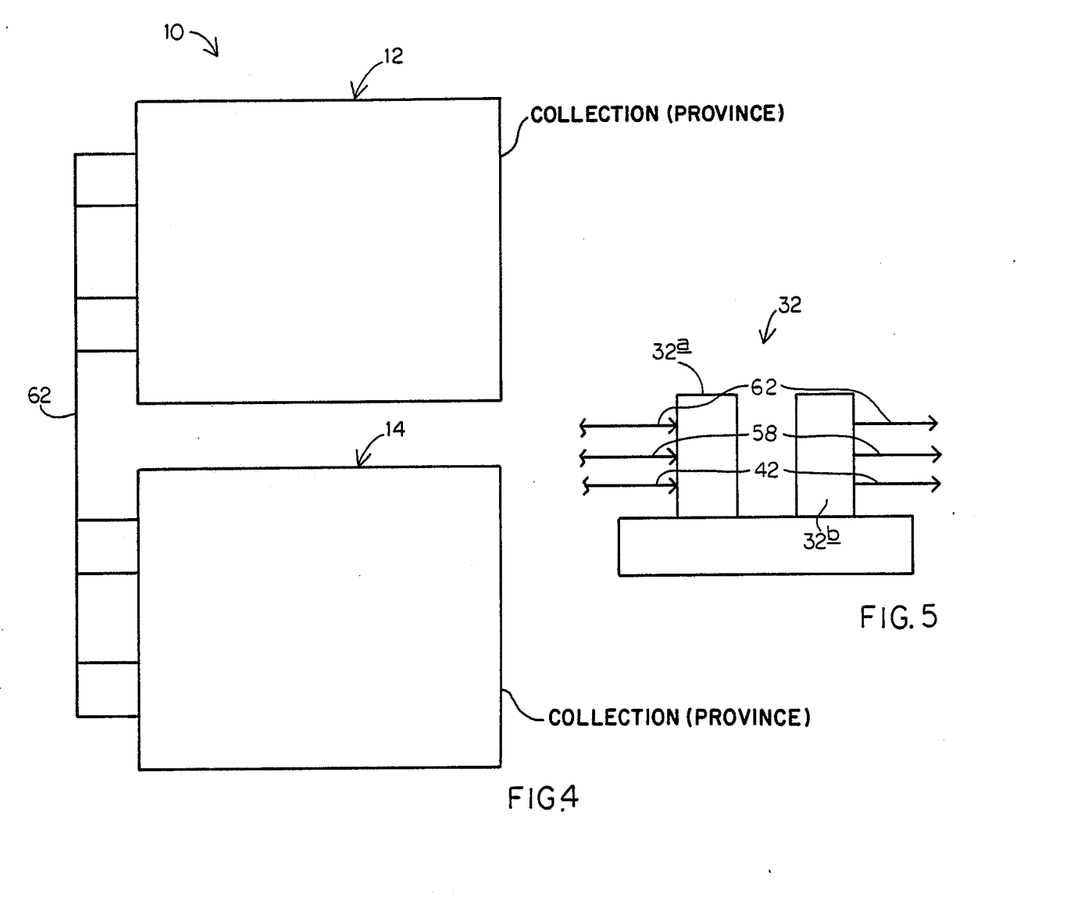
FIG. 4 shows a third, yet higher level communication bus structure.
FIG. 5 is a schematic view illustrating connections of the three levels of bus structure mentioned above to one of the physical nodes in the system of FIG. 1 (all other such nodes having similar connections).

With reference to FIGS. 1 and 4 together, symbolized by a bracket 62 in FIG. 1 is a bus, or bus structure (communication level), which links collections 12, 14. This, in system 10, is the highest-communication-level bus. In greatly simplified FIG. 4, this bus is shown in slightly more detail, and the reader will appreciate that the horizontal lines which connect with the sides of the blocks that represent collections 12, 14 extend into the respective collections in such a manner that bus 62 connects with all of the physical nodes in both collections. Put another way, bus 62 is connected to each of the thirty-two physical nodes which are contained within system 10.

As was mentioned earlier, each physical node in the system is connected to each of the three levels of bus structure. More particularly, each physical node is connected to be able to receive communications which have been transmitted on each level, and also to transmit, from each one of its associated connection nodes, a message to the appropriate one of the three communication levels.

FIG. 5 illustrates this situation with respect to physical node 32 which is in family 24 within group 16. In FIG. 5, node 32 is represented symbolically as including a reception center 32a and a transmission center 32b. As one will recall, the lowest-level communication bus which serves the group including node 32 is bus 42, and incoming and outgoing connections for this bus are represented in FIG. 5 by appropriate arrows. Node 32 also is connected for communication with each other physical node in collection 12 by way of bus 58, and, accordingly, arrows in FIG. 5 indicate incoming and outgoing connections to this bus. Finally, node 32 communicates with all other physical nodes in system 10 via bus 62, and this bus's incoming and outgoing connections to node 32 are shown, likewise, by arrows.

Referring back again to FIG. 1, indicated in dashed lines at 64 is another family in system 10 which happens to reside in collection 14 in a "location" which corresponds to that of family 24 in collection 12. The reason for introducing this family is to aid in discussions which follow relating to (1) assignment of node addresses, and (2) representative, intercollection communication.

Also, indicated at 65 in FIG. 1, within group 20, is a family which corresponds, in that group, to family 24 in group 16. This additional family is identified for the purpose of (1) further aiding an understanding of node addressing, and (2) illustrating intergroup communication within a collection.

Figure 6:
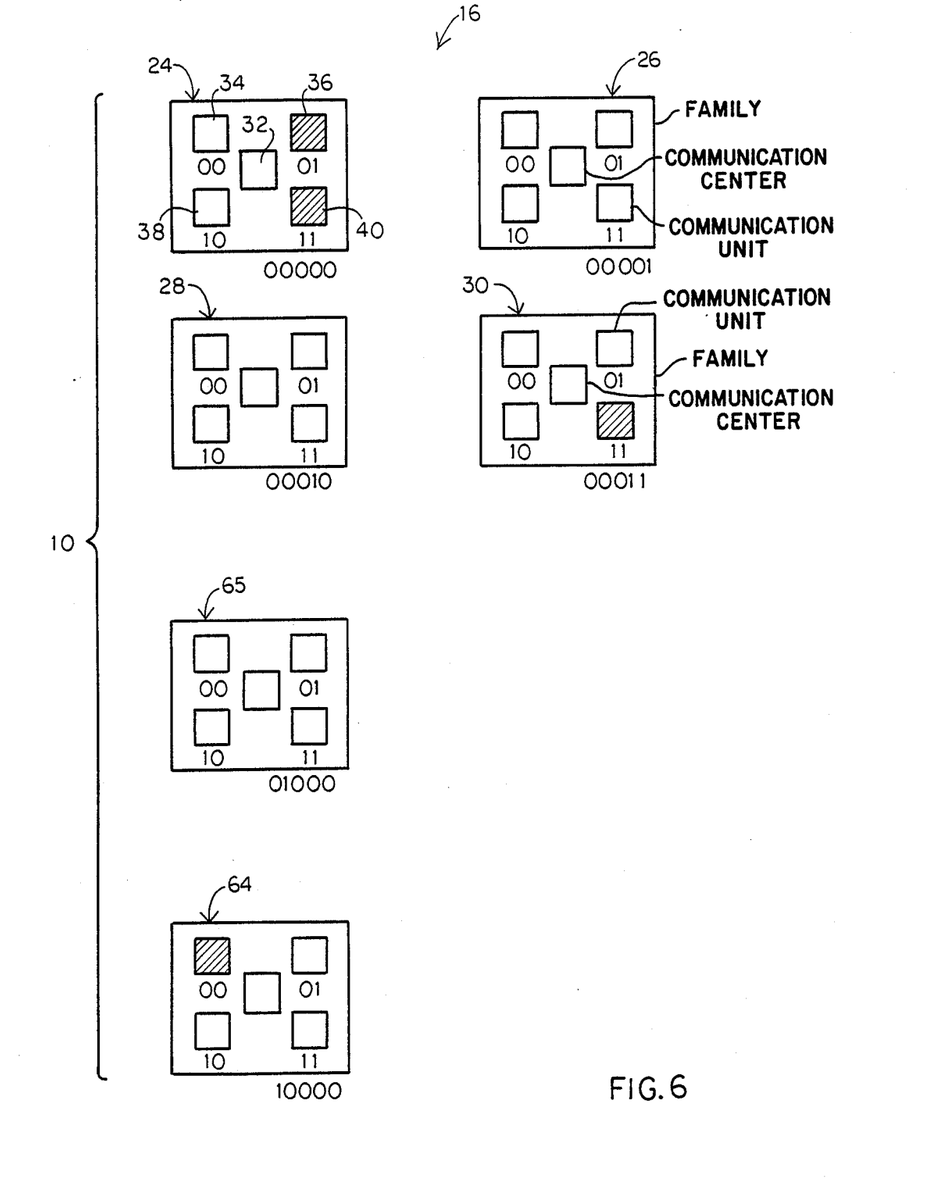
FIG. 6 is a fragmentary detail, on an enlarged scale, drawn from FIG. 1 to illustrate fully a connection-node address scheme, and partially a physical-node address scheme.

Turning attention now to FIG. 6, here, several of the families in different groups and collections are illustrated with a view toward explaining, inter alia, the way in which node addresses are assigned in system 10. More specifically: each of the four families in group 16 is illustrated at the top of FIG. 6; family 65 in group 20, which family corresponds to family 24 in group 16, occupies a central portion of the figure; and family 64, which occupies in collection 14 the same "location" as family 24 in collection 12, is shown at the bottom of the figure. The specific nodes which have been particularly identified previously in family 24 bear in FIG. 6 the same reference characters given to them earlier.

One will note that two of the connection nodes in family 24, one in family 30, and one in family 64 have been shaded to highlight them. This has been done to aid in an understanding of the four, illustrative communication patterns still to be described with reference to FIG. 8.

Considering now the node addressing scheme, it will be immediately apparent that, within each family, the four connection nodes need only a two-bit binary address to distinguish them. This, of course, is because only two bits of information are required to identify four different nodes. Obviously, if a greater number of connection nodes were present in family 24, a greater number of bits would be required accordingly. But still, within an entire system, identification of communication nodes within a given family will require the smallest number of bits for identification in the system.

As can be seen, the pattern of two-bit address identification for the four connection nodes in family 24 is repeated for the four, same, respective connection nodes in all of the other families in system 10.

Because of the fact that there are thirty-two physical nodes in system 10, and of the further fact that each may be required to communicate with a physical node over the highest bus level in the system, each physical node, nominally, has a five-bit address. This, of course, is because five bits of information are required to distinguish thirty-two nodes.

Figure 7:
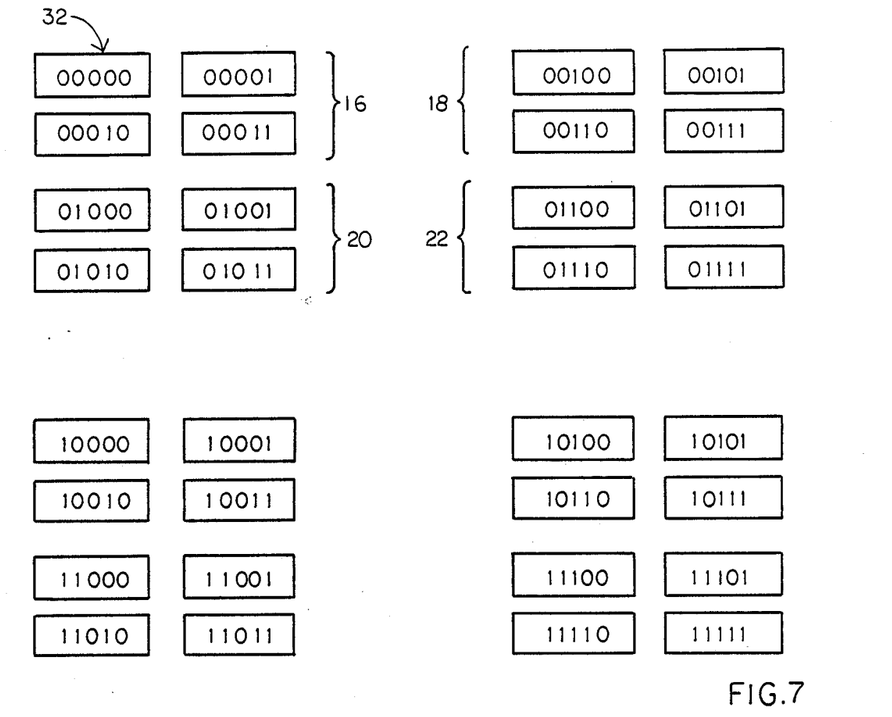
FIG. 7 illustrates an overall physical-node address scheme.

FIG. 7 presents the overall, physical-node address scheme employed in system 10. Here, all thirty-two physical nodes are shown as blocks containing their binary addresses, with these blocks organized in the same fashion that has been used hereinabove to display the physical organization of the system as a whole.

For a given implementation and operation of system 10, each connection node in the system is assigned to broadcast information on one, and one only, of the three buses in the system. If, for example, a particular connection node is intended to broadcast information only to a neighboring node within its family or group, it is assigned to broadcast only on that lowest-level bus which is directly associated with such family and group. As an illustration, if connection node 34 is intended to broadcast only to one or more other connection nodes in family 24, or anywhere else in group 16, whenever it broadcasts, it will broadcast only on bus 42. A connection node assigned to broadcast information to one or more other connection nodes within its collection will always broadcast information only on the second, higher-level bus associated with that collection. Thus, if node 36 fits into this category, it will broadcast information only on bus 58. Finally, where a connection node is intended to communicate with one or more such nodes anywhere within the entire system, including nodes outside of its collection, it will broadcast information only on bus 62.

Accordingly, associated with each connection node is what might be thought of as a bus access code which identifies the bus on which that node is assigned for communication. This, in the system now being described, takes the form of a two-bit binary code to identify the intended bus. Such codes, for the connection nodes associated with a particular physical node, reside in appropriate, physical-node memory territories assigned to the respective connection nodes. Whenever a connection node is ready to broadcast information, its associated physical node will note this code so as to promote broadcast only on the correct bus.

When a connection node, via the action of its associated physical node, broadcasts information, there are three pieces of information which are included in such a broadcast. One is the physical-node address; another is the connection-node address; and the third is the node's new "state". This kind of a communication scheme is referred to herein as "come-from" address broadcasting. In other words, as far as an outgoing communication is concerned, all that is broadcast in the system is an identification of the specific connection node in the system which is broadcasting, and the new or changed state of that node.

Looking a little more closely at this broadcasting scheme, if a particular connection node is one of those which is intended to broadcast only to a neighbor in its family or group, with respect to that part of the broadcast which includes the associated physical node address, only the lowest two bits of the physical node's address need be broadcast. If, however, a node is assigned to broadcast on the next, higher-level bus, such as on bus 58, each associated broadcast will contain the lowest four-bit portion of the associated physical node's address. This, obviously, is necessary in order properly to identify the precise location of the broadcasting connection node. Broadcasts from nodes which communicate on bus 62 will include all five bits of the associated physical node's address. Again, this is necessary for proper, precise, broadcast-source identification.

With an understanding of the broadcast scheme just generally described above, the concept of locality-of-communication dominance in system 10 ought to be apparent. Ideally, those connection nodes which experience the greatest frequencies of communications will broadcast on the lowest-level bus, and their broadcasts will contain the smallest amount of data. Nodes which broadcast on the second, higher-level bus structure are, preferably, those which experience lower frequencies of communications. So, while their broadcasts must contain a larger identifying data field, their overall occupation of communication time in the system is minimized by the fact that they are low-frequency communicators. Finally, those connection nodes which must broadcast on the highest-level bus are those which have the lowest frequencies of communications in the system. This lowest-frequency characteristic offsets the requirement that their broadcasts contain the largest identifying data field.

When system 10 is operating, all of the physical nodes in the system continuously "listen" to the communication traffic on all three levels of bus structure. Within the memory of each physical node, for each of its associated connection nodes, is a memory map associated with each of the three bus structures, to identify the "come-from" addresses of those other connection nodes which are intended to communicate with that particular connection node. So, whenever a communication originates from a given connection node in the system, the broadcast address of that node is matched to the connection-node memory maps in all of the physical nodes to determine whether a connection (communication) is to be made or not.

Figure 8:
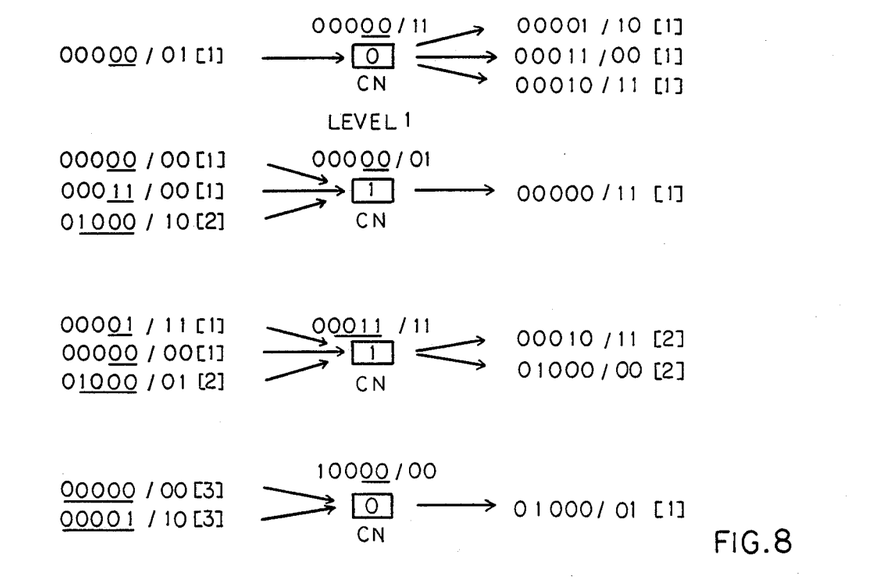
FIG. 8 illustrates communication patterns (connections) for each of four different connection nodes in the structure of FIG. 1.

Let us take a look now at FIG. 8. As was mentioned earlier, this figure illustrates communication patterns for each of four different connection nodes in system 10. Reading through the figure, from the top down, four connection nodes are shown laterally centrally in each illustration. The top node, identified immediately above by its physical-node address/connection-node address, turns out to be connection node 40 in family 24. One will note that this is one of the four shaded nodes in FIG. 6. The second node down, identified immediately above by its physical-node/connection-node addresses, is connection node 36. This node also is one of the shadowed nodes in FIG. 6. The third connection node illustrated in FIG. 8 is the lower right-hand connection node in family 30, and this node is seen shadowed in FIG. 6. The last (lowest) node shown in FIG. 8 is the upper left-hand connection node in family 64—also shadowed in FIG. 6.

Beginning with the first (top) connection node displayed in FIG. 8, and reading in from the left side of the illustration, this node is to be communicated to only by one other connection node in the system and such turns out to be a neighboring node within its own family—namely, node 36. The digits to the left-hand side of the slash mark identify the communicator's physical node address, and those to the right of the slash mark, outside of the brackets, identify the particular communicating connection node. Because of the fact that this communication will come from a node within its own family, such communication will take place on the associated, first, lowest-level bus structure 42 (which structure has been identified with the numeral one displayed within the brackets). When the physical node (32) for node 36 broadcasts, its broadcast contains only the lowest two bits of the physical-node address, along with the connection node's two-bit address, and whatever is node 36's new state. The underlining (in FIG. 8) of these two lowest bits in the communicator's physical-node address is to highlight this situation.

The first (top) connection node in the figure, while intended to receive a communication only from one other connection node in the system, is intended to broadcast to three other connection nodes whenever its state changes. The identities of these "receiving" nodes are given by the three physical-node/connection-node addresses appearing on the right side of the illustration. It turns out that these three nodes all reside within the same group, and, accordingly, communication will take place on the first, lowest-level bus (indicated by the three bracketed ones).

When the upper connection node shown in FIG. 8 is ready to broadcast its new state, which state is indicated by a zero in the central block that represents the node, what will go out over the lowest-level bus structure will be the lowest two bits (00) of its associated physical node's address, its own address (11), and its state (0). All associated physical nodes in the system will receive this communication on the associated lowest-level bus structure 42 simultaneously, and those physical nodes which are associated with the particular, three connection nodes to which communication is intended, will have, in their respective memory maps associated with those receiving connection nodes, the come-from address of the broadcasting node. Accordingly, they will respond by noting the new state of the broadcasting connection node.

Continuing, the second connection node illustrated in FIG. 8 is intended to receive communication from three other nodes, two of which will broadcast on the first, lowest-level bus structure, and the third of which will broadcast on the intermediate-level bus structure. This node is intended, when it broadcasts, to communicate only to a single, other connection node, on the lowest-level bus structure. Thus, associated with this second node, vis-a-vis receiving communications, will be the come-from addresses of the three incoming communicating nodes. Two of these will have their broadcasts include only the two lowest bits in the associated physical-node address, inasmuch as these communicate only over the lowest-level bus, and the third will include the four lowest bits in the physical-node address, since communication must take place over the second, intermediate-level bus structure.

The pattern now for reading and understanding the communication organization for the other two connection nodes represented in FIG. 8 should be clearly recognizable. Thus, the third connection node illustrated in FIG. 8 is intended to receive communications from three nodes—two on the lowest-level bus structure, and one on the intermediate-level bus structure. This third illustrated node is intended to broadcast to two other nodes, on the intermediate bus structure. Accordingly, while the first two nodes illustrated in FIG. 8, when they broadcast, transmit only the lowest two bits of their associated physical node's address (note the underlining), the third node must have its broadcast include the four lowest bits in its associated physical node's address. This, of course, is highlighted by the underlining of such bits in the physical-node address, directly over the central block representing the node now being discussed.

Finally, the fourth connection node illustrated in FIG. 8 is intended to receive communication from two other nodes in the system, on the third, highest-level bus structure. It is intended to broadcast information only to one other node in the system, on the first, lowest-level bus structure. Because of this pattern, the incoming broadcasts which are to be received by this connection node will include all five bits of the associated physical-node addresses (see the underlining). Its own broadcast, however, will include just the two lowest bits in its associated physical node's address.

Figure 9:
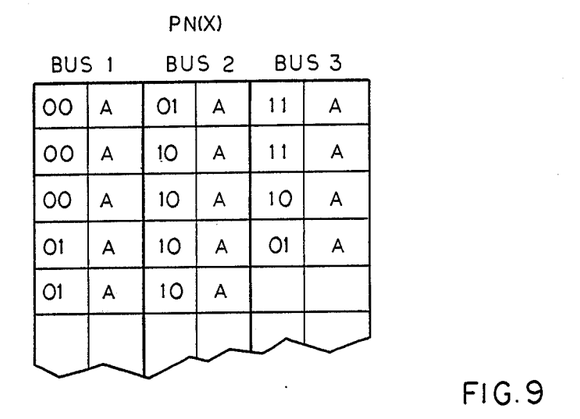
FIG. 9 is a fragmentary schematic illustration of what might be thought of as a connection-node memory map for a physical node in the structure of FIG. 1.

Turning attention now to FIG. 9 here, fragmentarily shown, is a representation of that part of a memory map associated with a physical node, generally designated PN(X), which indicates, how, for each of the three levels of bus structure in the system, it associates, with each of its related connection nodes, the come-from addresses which identify properly communicating outside nodes.

The map of FIG. 9 is divided into three columns, each one, as the heading indicates, relates to one only of the three different bus levels. The heading "BUS 1" represents the lowest-level bus structure, the heading "BUS 2" the intermediate bus structure, and the heading "BUS 3" the highest-level bus structure. For the sake of simplicity, the map of FIG. 9 is shown with five communications expected on the lowest bus level, an equal number on the intermediate bus level, and four on the highest-level bus structure. The organization and architecture of this map should easily be understood from a description of the contents of the column relating to "BUS 1". As can be seen, this column, as is true for the other two columns, is divided into two sub-columns. In the left-hand sub-column are indicated the addresses of the associated connection nodes (vis-a-vis physical node PN(X)) to which communications from the "outside world" are expected. Thus, reading this sub-column, the connection node whose address is 00 is expected to receive communications from three other connection nodes in the system, whose come-from addresses (represented by the capital letter (A)), are also stored in the related memory map area. The associated connection node whose address is 01 is intended to receive, on BUS 1, communications from two other connection nodes in the system, and the come-from addresses associated with these, also represented by the capital letter (A) in FIG. 9, are appropriately associated in the proper memory map location.

This same association pattern, of course, relates to the other two principal columns in FIG. 9.

Figure 10:
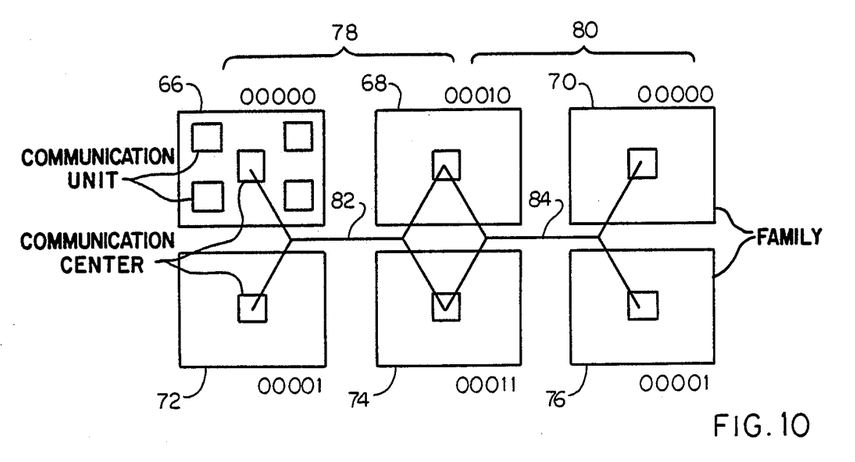
FIG. 10 illustrates a modification to the structure of FIG. 1 which features overlapping of the lowest bus structure vis-a-vis certain arrangements of physical and connection nodes.

Shifting attention now to FIG. 10, an important possible modification of the system so far described is illustrated schematically. More particularly, shown at 66, 68, 70, 72, 74, 76 are six families of physical nodes and connections nodes which are substantially the same as those which have been described hereinabove. These six families, however, are organized into two groups 78, 80, which may be thought of as overlapping groups, inasmuch as each group "shares" families 68, 74. Put another way, families 68, 74 are common to both groups.

Shown at 82, 84 are bus structures for groups 78, 80, respectively, which bus structures correspond to previously described, lowest-level bus structure 42.

Such an overlap scheme, while shown herein with a relatively simple example, can be implemented, as those skilled in the art will appreciate, in diverse and more complex ways—all of which help to achieve higher-density, practical use of the physical "semiconductor real estate" in which the physical components of the system are realized.

Where an overlap scheme, such as that shown in FIG. 10, is used in the architecture structure, connection nodes in the overlap region may be assigned to broadcast on more than one bus. For example, while it is certainly possible that a connection node in family 68 might be assigned only to broadcast on bus 82 or on bus 84, it could also be assigned, in certain applications, to broadcast on both of these buses. Where this is the case, there will be an appropriate bus-broadcast-assignment data field which the appropriate physical node will associate with that connection node for its broadcasting purposes.

From the structural, and partial operational, discussions given above, the method of practising the invention should now be apparent. More particularly, in a broadcast-hierarchical setting, which includes at least two levels of communication, the steps of the method include establishing a first information-handling level including plural neighborhoods of connection nodes, creating a communication discourse between selected nodes on this first level alone, whereby a node in a given neighborhood is able to communicate only with a neighboring node, establishing at least a second, higher-level communication level which is effective operatively to link each neighborhood with at least one other neighborhood, and enabling on such second level of communication a communication discourse between a node in a given neighborhood with at least one node in a linked neighborhood. Obviously, a similar but slightly more involved pattern of practising the invention takes place when there is present, as disclosed herein, yet a third, even higher-level communication level which promotes communication discourses between nodes in different "provinces" within the system.

Thus, a novel information-handling architecture and information-handling method have been disclosed herein. The proposed structure and method offer all of the important features and advantages outlined above. In addition, and with regard to the proposed architecture of the system, a very large system can, when compared with other prior art systems, be constructed on a relatively small area. For example, a practical system might typically include about 64,000 physical nodes, with each having associated with it about sixteen connection nodes, each of which is intended to have about a thousand connections with other connection nodes. Such a system, employing today's VLSI technology, could be built on about twenty-four eight-inch wafers and, with integrated circuit wafer technology which is expected to be practically available within the next few years, the entire system of such a size could be built on a single eight-inch wafer.

Accordingly, while a preferred embodiment of the invention, a proposed modification thereof, and a preferred manner of practising the invention, have been described herein, it is appreciated that variations and modifications may be made without departing from the spirit of the invention.

We claim:

1. A neural-model, broadcast-hierarchical, locality-of-communication-dominant, information-handling architecture structure comprising a first information-handling level, including plural information-handling families organized into plural groups of such families, with each family in each group including at least two communication units and an associated communication center for communicating via a first level communication bus, directly on said first level, only with its family-associated units and with the communication centers in the other families in the same group, thus to enable broadcast communication, and simultaneous cooperative information handling, between different, respective, selected units in the families in the group, and at least one other, higher-level, information-handling level, including means operatively communicative directly with said communication centers in the families in said first level for enabling the selective broadcast communication of information between different centers in the different groups via second level communication bus, thus to accommodate broadcast communication, and simultaneous cooperative information handling, between selected units in the families in different groups which share said first level.

2. The structure of claim 1, wherein each communication unit comprises a virtual (connection) node, and each communication center comprises a physical (computational) node.

3. The structure of claims 1 or 2, wherein each communication unit, in conjunction with its family,s communication center, is assigned a bit address, and the same communicates with other communication units through a procedure which includes broadcasting of such address.

4. The structure of claims 1 or 2, wherein certain families operatively reside in more than one group.

5. A neural-model, broadcast-hierarchical, locality-of-communication-dominant, information-handling architecture structure comprising a first information-handling level, including plural information-handling families organized into plural groups of said familes, and into plural collections of said groups, with each family in each group including at least two communication units and an associated communication center for communicating via a first level communication bus, directly on said first level, only with its family-associated units and with the communication centers in the other families in the same group, thus to enable broadcast communication, and simultaneous cooperative information handling, between different, respective, selected units in the families in the group, independently for each of said collections, a second, higher-level, information-handling level, including means operatively communicative directly with said communication centers in the families in the groups in the associated collection for enabling the selective broadcast communication of information between different centers in the different groups via a second level communication bus, thus to accommodate broadcast communication, and simultaneous cooperative information handling, between selected units in the families in the different groups in the collection, and yet another, even higher-level, information-handling level, including means operatively communicative directly with all of said communication centers in all of said collections for enabling the selective broadcast communication of information between different centers in the different collections via a higher-level communication bus, thus to accommodate broadcsat communications, and simultaneous cooperative information handling, between selected units in the collections.

6. The structure of claim 5, wherein each communication unit comprises a virtual (connection) node, and each communication center comprises a physical (computational) node.

7. The structure of claims 5 or 6, wherein each communication unit, in conjunction with its family's communication center, is assigned a bit address, and the same communicates with other communication units through a procedure which includes broadcasting of such address.

8. The structure of claims 5 or 6, wherein certain families operatively reside in more than one group.

9. A neural-model, broadcast-hierarchical, locality-of-communication-dominant, information-handling method which is implementable by an information-handling architecture structure that includes plural communication units, said method comprising establishing a first information-handling level including plural neighborhoods of such units, creating a communication discourse on a first-level communication bus between selected units on such first level alone, whereby a unit in a given neighborhood is able to communicate only with a neighboring unit, establishing at least a second, higher-level communicating level which is effective operatively to link each neighborhood with at least one other neighborhood, and enabling on such second level a communication discourse on a second-level communication bus between a unit in a given neighborhood with at least one unit in a linked neighborhood.

10. The method of claim 9, which further includes associating a bit addess with each such unit, and promoting communication from the unit through a procedure including broadcasting of such associated address.

11. The method of claims 9 or 10, wherein said establishing of such second level creates plural, second-level-independent provinces of linked neighborhoods, and which further includes establishing yet another, even higher-level, information-handling level which is effective operatively to link each such independent province via a higher-level communication bus with at least one other independent province, thus to enable, on such other level, a communication discourse between a unit in a given province with at least one unit in a linked province.

12. The method of claim 11, wherein communication between a given unit and any other units via such levels is enabled simultaneously, and is independent of any other like communication by another unit.

* * * * *